(12) United States Patent
Reiss, Jr.

(10) Patent No.: US 7,815,811 B1
(45) Date of Patent: Oct. 19, 2010

(54) TRASH RAKE SYSTEM FOR CLEARING INTAKE RACKS AND THE LIKE

(75) Inventor: Thomas J. Reiss, Jr., Ixonia, WI (US)

(73) Assignee: Hydro Component Systems, LLC, Watertown, WI (US)

( * ) Notice: Subject to any disclaimer, the term of this patent is extended or adjusted under 35 U.S.C. 154(b) by 1383 days.

(21) Appl. No.: 11/144,393

(22) Filed: Jun. 3, 2005

(51) Int. Cl.
 *B01D 29/64* (2006.01)
(52) U.S. Cl. ............... 210/791; 210/159; 210/162; 210/154; 210/241; 210/413
(58) Field of Classification Search ............ None
 See application file for complete search history.

(56) References Cited

U.S. PATENT DOCUMENTS

| | | | |
|---|---|---|---|
| 2,866,555 A * | 12/1958 | Nordell | ............ 210/769 |
| 3,193,104 A | 7/1965 | Leach | |
| 3,482,698 A | 12/1969 | Ostnas | |
| 3,909,411 A | 9/1975 | Angele et al. | |
| 4,138,334 A * | 2/1979 | Rimmele | ............ 210/159 |
| 4,218,319 A | 8/1980 | Hansson | |
| 4,222,878 A * | 9/1980 | Hansson | ............ 210/413 |
| 4,447,323 A | 5/1984 | Jackson | |
| 4,792,394 A | 12/1988 | Rudzinski | |
| 4,846,966 A | 7/1989 | Pastore | |
| 4,857,182 A | 8/1989 | Jackson | |
| 5,074,996 A | 12/1991 | Galanty et al. | |
| 5,098,561 A | 3/1992 | Grabbe | |
| 5,167,803 A | 12/1992 | Newton et al. | |
| 5,246,573 A | 9/1993 | Lodholz et al. | |
| 5,571,406 A | 11/1996 | Mensching | |
| 5,718,771 A | 2/1998 | Cassell et al. | |
| 5,968,350 A | 10/1999 | Davignon | |
| 6,016,920 A | 1/2000 | Brauch et al. | |
| 6,129,215 A | 10/2000 | Brauch et al. | |
| 2007/0125691 A1 * | 6/2007 | Reiss, Jr. | ............ 210/159 |

* cited by examiner

*Primary Examiner*—Robert James Popovics
(74) *Attorney, Agent, or Firm*—Reinhart Boerner Van Deuren S.C.

(57) ABSTRACT

A powered trash rake system for clearing debris from intake racks used for screening debris from water intakes and other similar structures. The trash rake system includes a telescoping boom mounted to a movable carriage support structure. Electric motors are provided to move the carriage support structure to desired positions along the intake rack to be cleaned and to operate the telescoping boom to move a trash rake structure under power vertically along the trash rack to remove debris therefrom.

17 Claims, 7 Drawing Sheets

TRASH RAKE SYSTEM FOR CLEARING INTAKE RACKS AND THE LIKE

FIELD OF THE INVENTION

This invention pertains generally to trash rakes and other devices and systems for clearing debris from intake screens or racks that are used to prevent debris from entering into systems and facilities that intake water from exposed above-ground water sources such as rivers, lakes, oceans and the like.

BACKGROUND OF THE INVENTION

Various systems and facilities intake large quantities of water from various exposed natural and other above-ground water sources, such as rivers, lakes, oceans, reservoirs, irrigation and flood water canals, outdoor water parks, other water conveyance structures, and the like. Examples of such systems and facilities include hydroelectric plants, pulp and paper mills, steel mills, petro-chemical plants, municipal water systems and waste water plants, nuclear and other energy facilities that use the water for cooling or for other purposes, other water filtering or screening facilities, etc. In all such systems it is important to screen naturally occurring debris found in the exposed above-ground water source from the flow of water that is taken into and employed by the system or facility. Such debris may include, for example, leaves, branches, and other portions of trees or other plants that have fallen into or grown in the water source, trash, and other debris that has been dumped or otherwise found its way into the exposed above-ground water source, etc. Such debris could cause significant damage to the system or facility obtaining water from the exposed above-ground water source if it were allowed to enter into the system or facility.

Various screening systems are known and used for preventing debris found in exposed above-ground water sources from entering into the systems or facilities described above. For example, fine mesh screening may be used to exclude even small pieces of debris from such systems. Screening systems with larger openings may be used, either alone or in combination with finer screening, to prevent large debris from entering the system or facility taking water from the exposed above-ground water source. Such larger opening screening systems may be used for preventing large debris from reaching finer mesh screening positioned downstream from the larger opening screening. Larger opening screening systems preferably do not dramatically adversely affect the water flow volume provided into the facility or system through the screening system.

An exemplary screening system of this type is known as an intake rack system or trash rack. Intake rack systems typically provide screening using a series of vertically oriented parallel blades separated by spacers and mounted on horizontally oriented rods. The spacing between the blades forming the intake rack is selected to screen debris of the desired size from entering the water intake of the system or facility that the trash rack is protecting, without significantly reducing water flow into the water intake. Such intake racks may be made of metallic or non-metallic materials. Intake racks of this type are available, for example, from Hydro Component Systems, LLC of Watertown, Wis. In a typical application, intake racks of this type may be mounted upstream from the water intake of a hydroelectric or other plant, system or facility that intakes water from a river or other similar exposed above-ground water source. The elongated vertically oriented parallel blades forming the intake rack extend downward into the water to prevent debris floating at the water surface or in the water below the water line from entering the system or facility.

As an intake rack or other screening structure prevents the flow of debris into the water intake of a system or facility from an exposed above-ground water source, the debris being screened will build up on the intake rack or other screening structure. This accumulating debris must be cleared from the intake rack or other screening structure on a regular basis, to prevent the buildup of such debris from interfering with the flow of water into the system or facility water intake. One way to remove such accumulated debris from an intake rack or other screening structure is to remove the rack or other screening structure from its operational position for cleaning. Removing an intake rack or other screening structure for cleaning, however, is not a practical solution in many applications. For example, where an intake rack is used to screen debris from a water intake positioned on a river, debris flowing down the river can accumulate on the intake rack so rapidly as to require cleaning thereof on, in some cases, a daily basis, or even more often. Furthermore, removing an intake rack or other screening structure from service can require shutting down the system for which the structure is providing screening, or the use of a more complicated and expensive redundant screening system. Thus, various tools have been developed for cleaning accumulated debris from intake racks and similar screening systems without removing the racks from operation.

A typical tool for removing accumulated debris from an intake rack is known as a trash rake. A typical trash rake can include a rake-like structure including tines that are spaced apart so as to fit between the blades of an intake rack to be cleaned. This rake-like structure is positioned adjacent to and drawn vertically along the intake rack blades to remove accumulated debris therefrom.

Although trash rakes of this type may be operated manually, powered trash rake systems also have been developed that use powered systems to position a trash rake adjacent to the intake rack to be cleaned to break up accumulated debris and to draw the trash rake vertically along the intake rack to remove the debris therefrom. Typically, such powered trash rake systems have employed hydraulic mechanisms to position and move the trash rake along the intake rack to be cleaned. The use of such hydraulic systems is problematic for several reasons. Since such systems often are used to clear intake racks associated with water intakes positioned in natural public water sources, pollution of the water source due to leaks of hydraulic fluid is a significant concern. Furthermore, in cold operating conditions, the hydraulic fluid used in such systems can become fixed or viscous, such that powered trash rakes using such hydraulic systems do not work well in cold operating conditions.

Another limitation of existing powered trash rake systems, whether using hydraulic or other powered operation, is that such systems are not fully powered in all phases of operation. For example, current powered trash rake systems often rely on gravity to lower a trash rake structure into position along the intake rack to be cleared. An electric motor may then be used only to draw the trash rake structure upward along the intake rack, to clear debris therefrom. Relying on gravity and the weight of the trash rake structure to position the trash rake structure in the downward direction can be a serious limitation of current trash rake systems. Such systems are limited in their ability to break up debris or ice accumulated at the intake rack or water surface. The debris cleared from the intake rack using such systems typically is dumped onto a deck or conveyor located at the top of the intake rack system to be hauled away to a nearby debris disposal location. Thus, an expensive and/or time consuming secondary system or process must be employed to haul away the debris that has been removed from an intake rack using such current systems. Current trash rake systems do not allow an operator under all operating conditions simply, easily, and effectively under full power to position a trash rake adjacent to an intake rack to be cleaned, to move the trash rake vertically across the rack effectively to remove debris therefrom, and then to carry the removed debris to a desired disposal location adjacent to the intake rack without the use of a secondary system or process.

What is desired, therefore, is a fully powered trash rake system for clearing debris from intake racks and similar water intake screening systems. Preferably, such a powered trash rake system may be manually or fully automatically controlled, does not employ any hydraulic systems that may cause pollution through leaks of hydraulic fluid, and is fully and effectively operable in all phases of operation in any weather, temperature, or other operating conditions.

SUMMARY OF THE INVENTION

The present invention provides a fully powered trash rake system for clearing debris from intake racks and other similar structures used for screening debris from water intakes positioned in natural or man-made exposed above-ground water sources. A fully powered trash rake system in accordance with the present invention may be manually or automatically controlled. For example, a fully powered and manually or automatically controlled trash rake system in accordance with the present invention may be used to clear debris from various different water intake screening systems such as trash racks, intake screens, cooling water screens, storm water overflows, culvert and drainage underflows, headworks, and flow straighteners, as used in applications such as hydroelectric and other power plants, cooling towers for nuclear energy and other power plants and other facilities, pulp and paper mills, steel mills, petro-chemical plants, municipal water and/or waste water plants, fish diversions, other water filtering and/or screening facilities or systems, etc. A trash rake system in accordance with the present invention is fully powered in all phases of operation in that positioning of the trash rake with respect to an intake rack or other structure to be cleaned is fully powered, movement of the trash rake vertically along the intake rack or other structure to remove debris therefrom is fully powered, and removal of the cleared debris to a trash dumping location adjacent to the intake rack or other similar structure is fully powered. Full powered motion of a trash rake system in accordance with the present invention is provided using electrical motors only, and no hydraulic systems, such that the risk of pollution of the water source through leaks of hydraulic fluid is eliminated and full operation under all temperature and other operating conditions is provided.

A trash rake system in accordance with the present invention includes a telescoping boom mounted to a support structure positioned adjacent to the intake rack or other screening structure to be cleared of debris by the trash rake system. The support structure preferably may be implemented as a moveable carriage that is movably mounted in position with respect to the intake rack to be cleared such that the carriage can be moved horizontally along the intake rack to position the telescoping boom in various positions along the intake rack. For example, the carriage support structure preferably may be mounted via wheels onto rails extending along the trash rack. An electric carriage drive motor preferably may be used to move the carriage under power along the rails to position the telescoping boom in any desired position along the intake rack to be cleaned.

In accordance with the present invention, a trash rake rake structure is positioned on the distal end of the telescoping boom, i.e., on the opposite end thereof from the trash rake system carriage support structure. The telescoping boom may be extended or retracted under power to move the trash rake at the distal end thereof vertically along the intake rack to be cleaned. The telescoping boom preferably is rotatably mounted to the trash rake system support structure carriage, such that the telescoping boom may be tilted under power in position with respect thereto to bring the distal end thereof, with the trash rake structure mounted thereon, into engagement with the intake rack to be cleaned, or to tilt under power the telescoping boom to move the trash rake at the distal end thereof away from the intake rack to be cleaned. The trash rake structure at the distal end of the telescoping boom preferably is rotatably mounted thereto such that the trash rake may be positioned in a first upward or raking position during use thereof to remove trash from the intake rack and in a second downward position that is used to dump trash cleared from the intake rack into a desired disposal location adjacent to the rack.

In accordance with the present invention, both retraction and extension of the telescoping boom are fully powered. That is, the telescoping boom is fully powered to position the trash rake at the distal end thereof vertically along the intake rack to be cleaned. Tilting of the telescoping boom, to move the trash rake at the distal end thereof toward or away from the intake rack to be cleared, or to any tilt position in between, preferably also is fully powered. Movement of the trash rake structure from the upward raking position to the downward dumping position also may be powered.

In accordance with the present invention, independently operable electric motors preferably are employed for all powered operations of the trash rake system, i.e., movement of the carriage support structure to position the telescoping boom in a desired position along the intake rack, extension and retraction of the telescoping boom to move the trash rake structure at the distal end thereof vertically along the intake rack, tilting of the telescoping boom to move the trash rake at the distal end thereof toward or away from the intake rack surface, and movement of the trash rake at the distal end of the telescoping boom from the raking to the dumping position. Electric motor powered operation of a trash rake system in accordance with the present invention in this manner allows for fully effective operation of the system under all temperature conditions and eliminates the risk of pollution present in trash rake systems using hydraulic powered operation.

A powered trash rake system in accordance with the present invention may be operated under manual control by a single operator easily and effectively to clear debris from an intake rack or other water intake screening structure. A single hand-held wired or wireless control unit may be employed by the operator to control a carriage drive motor, a telescoping boom drive motor, a tilt drive motor and rake structure position to operate a trash rake system in accordance with the present invention to perform an intake rack clearing operation. For example, in an exemplary operation for removing debris from an intake rack using a trash rake system in accordance with the present invention an operator may use the hand-held controller first to operate the carriage drive motor to position the trash rake telescoping boom in a desired position along the intake rack. With the distal end of the telescoping boom tilted away from the intake rack, the telescoping boom drive motor may be operated to extend the telescoping boom downward under power, e.g., to position the trash rake structure at the distal end thereof below the surface of the water at which debris is collecting against the intake rack. The operator may then employ the hand-held control device to operate the tilt drive motor to bring the distal end of the telescoping boom toward the intake rack, such that the trash rake structure thereon is engaged against the intake rack to be cleared of debris. With the trash rake structure in the upward raking position, the tines of the trash rake may thus be engaged in the spaces between the blades of the intake rack to be cleared of debris. The operator may then employ the hand-held control device to operate the telescoping boom drive motor to retract the telescoping boom, thereby drawing the trash rake structure at the distal end thereof upward along the intake rack, thereby to capture debris accumulated on the intake rack in the trash rake. The tilt drive motor may then be operated to tilt the distal end of the telescoping boom away from the intake rack, to remove the engaged ends of the trash rake tines from engagement between the rack blades. The operator may then once again operate the carriage drive motor to move the carriage to a position adjacent to the intake rack where debris cleared from the rack is to be dumped. When in the desired position, the hand-held control device may be operated to rotate the trash rake structure into a dumping position, thereby to dump the debris collected thereon into the desired dumping location. This process may then be repeated for various positions along the intake rack to remove all accumulated debris therefrom. The various drive motors may, alternatively or additionally, be controlled by a programmable automatic controller, such that an intake rack clearing operation using a powered trash rake system in accordance with the present invention as just described may be performed with no or minimal operator input.

Further objects, features, and advantages of the invention will be apparent from the following detailed description taken in conjunction with the accompanying drawings.

DETAILED DESCRIPTION OF THE INVENTION

The present invention provides a fully powered trash rake system for clearing debris from water intake screening systems, such as intake racks. A trash rake system in accordance with the present invention is fully electronically powered in all phases of operation and may be operated in a manner such that pollution due to leaks of hydraulic fluid are avoided and full functional operation of the system under all temperature conditions is assured. An exemplary trash rake system in accordance with the present invention will be described in detail herein with reference to the use thereof for clearing debris from an intake trash rack used to screen debris from the water intake of a hydroelectric power plant or similar facility. It should be understood, however, that a trash rake system in accordance with the present invention also may be employed to clear debris from various water intake screening systems and structures other than intake racks, as well as other similar systems and structures. For example, a trash rake system in accordance with the present invention may be used to clear debris from intake screens, cooling water screens, storm water overflow screening structures, culvert and drainage underflow screening structures, headworks, and flow straighteners, etc. A trash rake system in accordance with the present invention may be used to clear debris from such intake or other screening structures as used in association with hydroelectric or other power plants, intake ducts for nuclear energy or other facility cooling water, pulp and paper mills, steel mills, petrochemical plants, municipal water and/or waste water treatment plants, fish diversions, and other water filtering or screening facilities or systems, etc. A trash rake system in accordance with the present invention may be used to clear debris from water intake screening structures for such systems and facilities as may be located in any natural or man-made exposed above-ground water source, such as rivers, lakes, oceans, reservoirs, irrigation and flood water canals, water parks, and other water conveyance structures, etc. in which any variety or type of natural or man-made debris may be found that otherwise might clog or obstruct such an intake screening system or structure.

Figure 1:
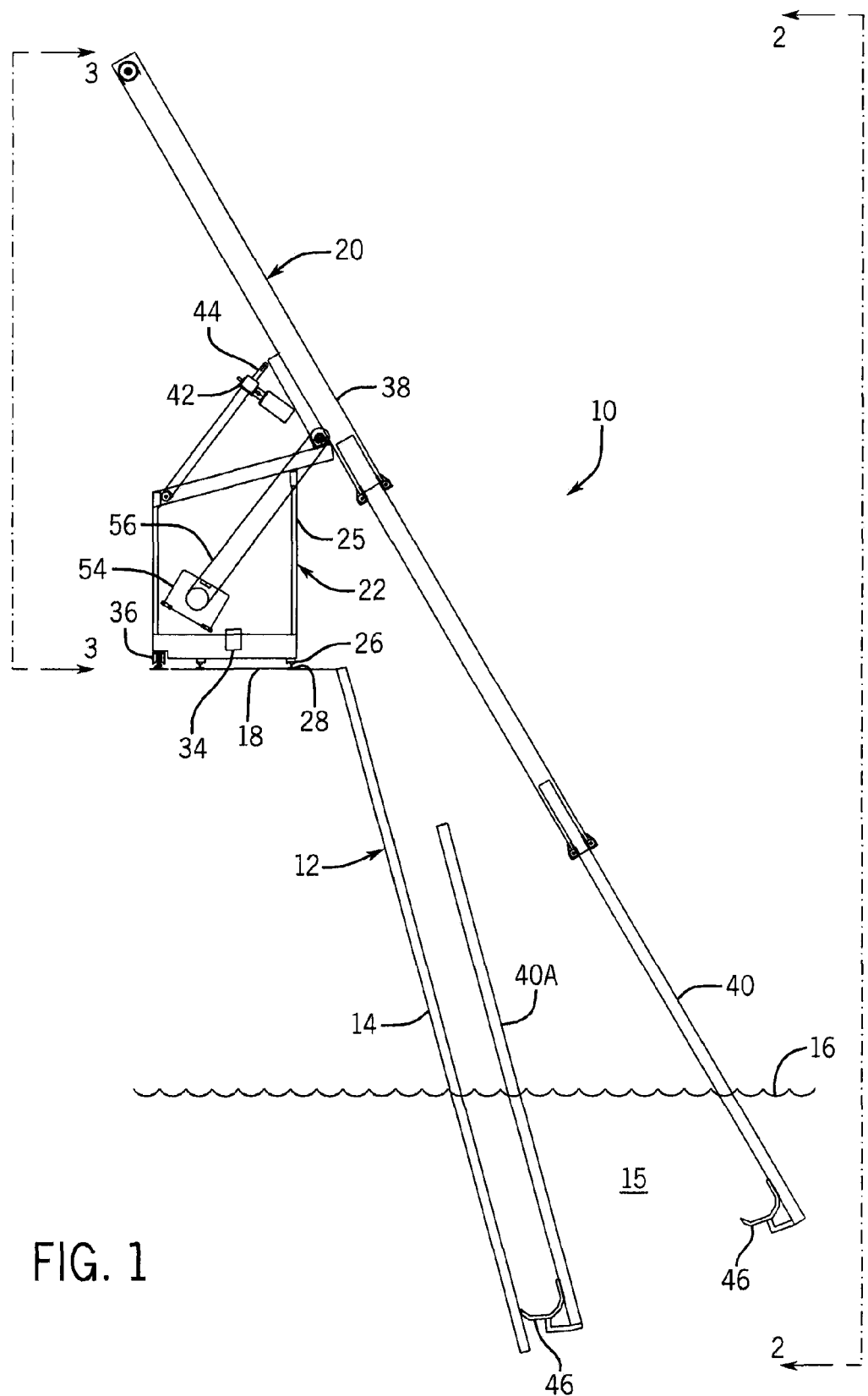
FIG. 1 is a schematic side view illustration of an exemplary trash rake system in accordance with the present invention for clearing debris from an intake rack as also illustrated therein.
Figure 2:
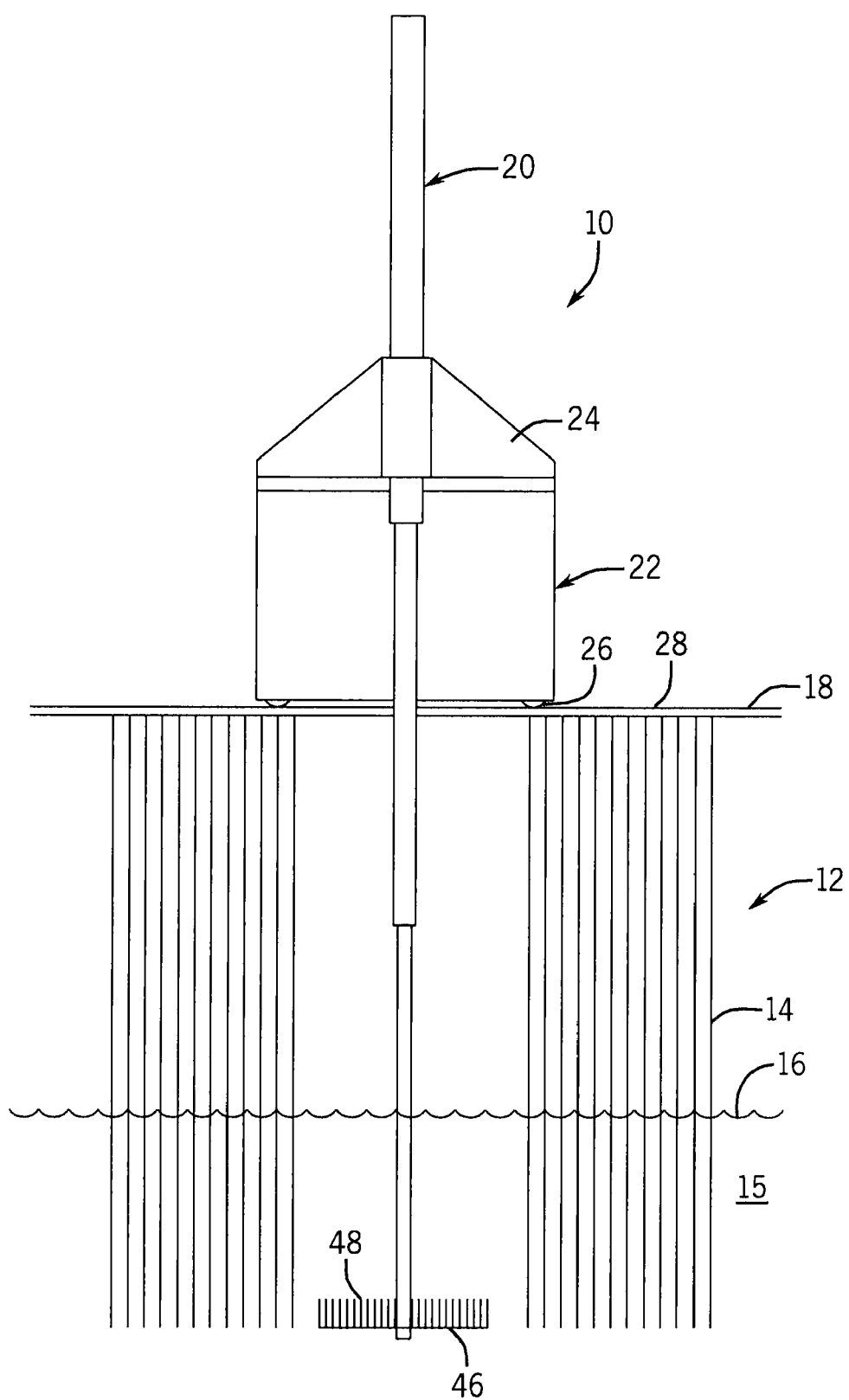
FIG. 2 is a schematic front view illustration of the exemplary trash rake system in accordance with the present invention and intake rack as illustrated in FIG. 1 as taken along line 2-2 of FIG. 1.
Figure 3:
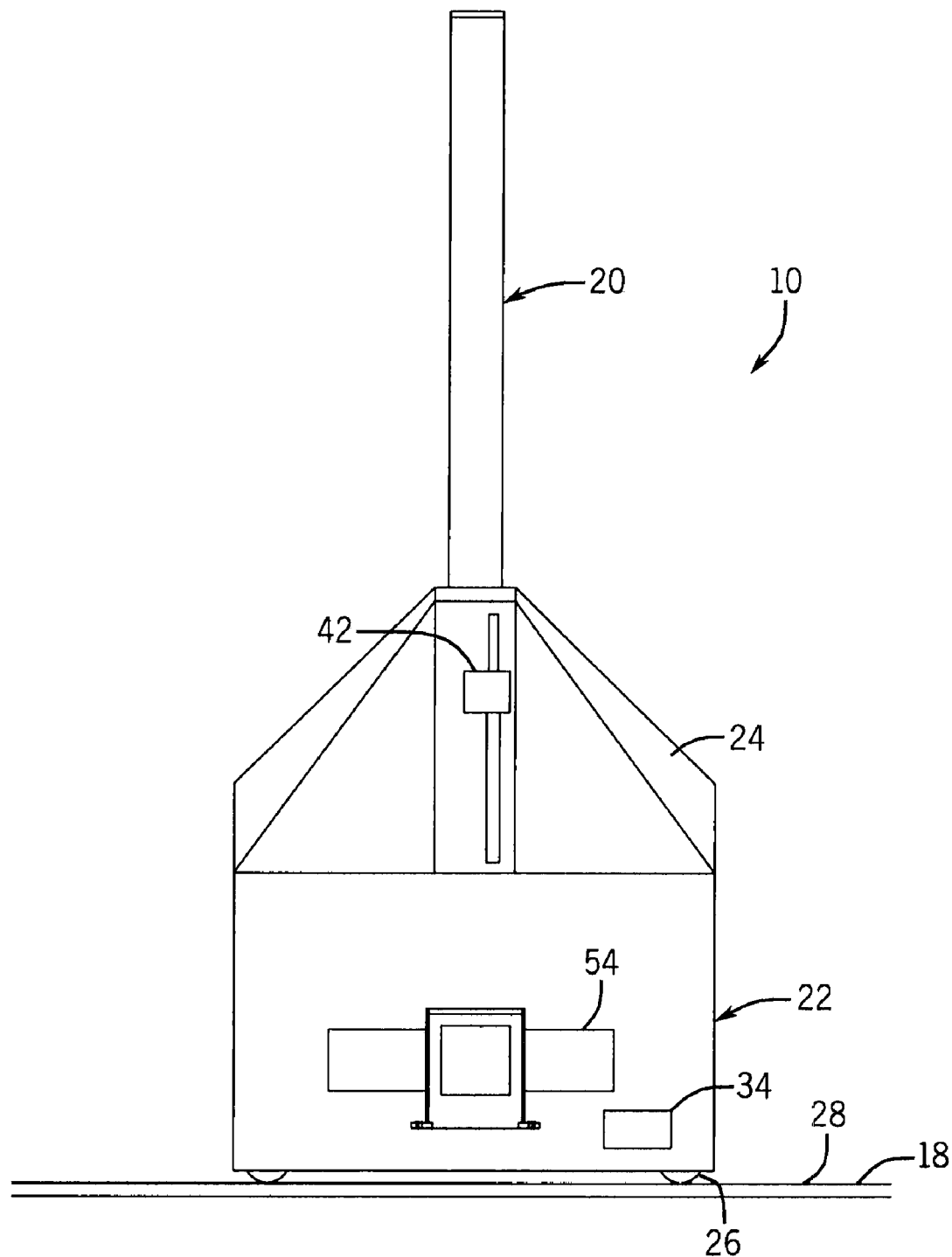
FIG. 3 is a schematic back view illustration of the exemplary trash rake system in accordance with the present invention of FIG. 1 as taken along line 3-3 of FIG. 1.

An exemplary trash rake system 10 in accordance with the present invention is illustrated in various views thereof in FIGS. 1-3. The exemplary trash rake system 10 is illustrated in association with an intake trash rack 12. The particular exemplary trash rake system 10 in accordance with the present invention illustrated herein is designed specifically to clear debris from such an intake trash rack 12. However, as discussed above, a trash rake system in accordance with the present invention also or alternatively may be designed to clear debris from other types of intake racks or other water intake screening systems.

A typical intake trash rack 12 is formed of a series of spaced apart blades 14. (Several of the blades 14 are not shown at the center of the intake rack 12 illustrated in FIG. 2 for the sake of clarity of the illustration of the exemplary trash rake system 10 in accordance with the present invention as illustrated therein.) The intake trash rack 12 is positioned such that the parallel blades 14 extend downward substantially vertically into a water source 15, e.g., a river. A water intake (not shown), e.g., for a hydroelectric plant or other system or facility, is positioned approximately directly behind, e.g., downstream from, the intake rack 12. Thus, water flowing downstream is allowed to enter the water intake through the spaces formed between the vertical blades 14 forming the intake rack 12. (Note that additional finer screening of debris also may be provided between the intake rack 12 and the system or facility water intake.) Natural or man-made debris flowing downstream, however, is prevented from entering the water intake by the blades 14 of the intake rack 12. Such debris captured by the intake rack 12 will tend to accumulate on the surface of the rack 12, typically at or slightly below the water line 16.

A horizontal intake deck 18 typically is provided along the top of the intake trash rack 12. The intake deck 18 thus is located above the water intake and allows a facility operator or other individual to access and inspect the intake rack 12 from above.

A trash rake system 10 in accordance with the present invention includes a telescoping boom structure 20 movably mounted on a support structure 22. The support structure 22 preferably may be a substantially box shaped structure that is designed both to support the telescoping boom 20 as well as to contain therein various electric motors and other components used to power and otherwise operate the trash rake system 10, as will be described in more detail below. As illustrated in FIGS. 2 and 3, the box like support structure 22 preferably is at least partially enclosed or covered, e.g., with a sheet metal or other covering 24 attached to a support structure frame 25 made of steel or some other appropriate structural material, thereby to protect the electronic and/or mechanical components contained therein from the elements.

Figure 4:
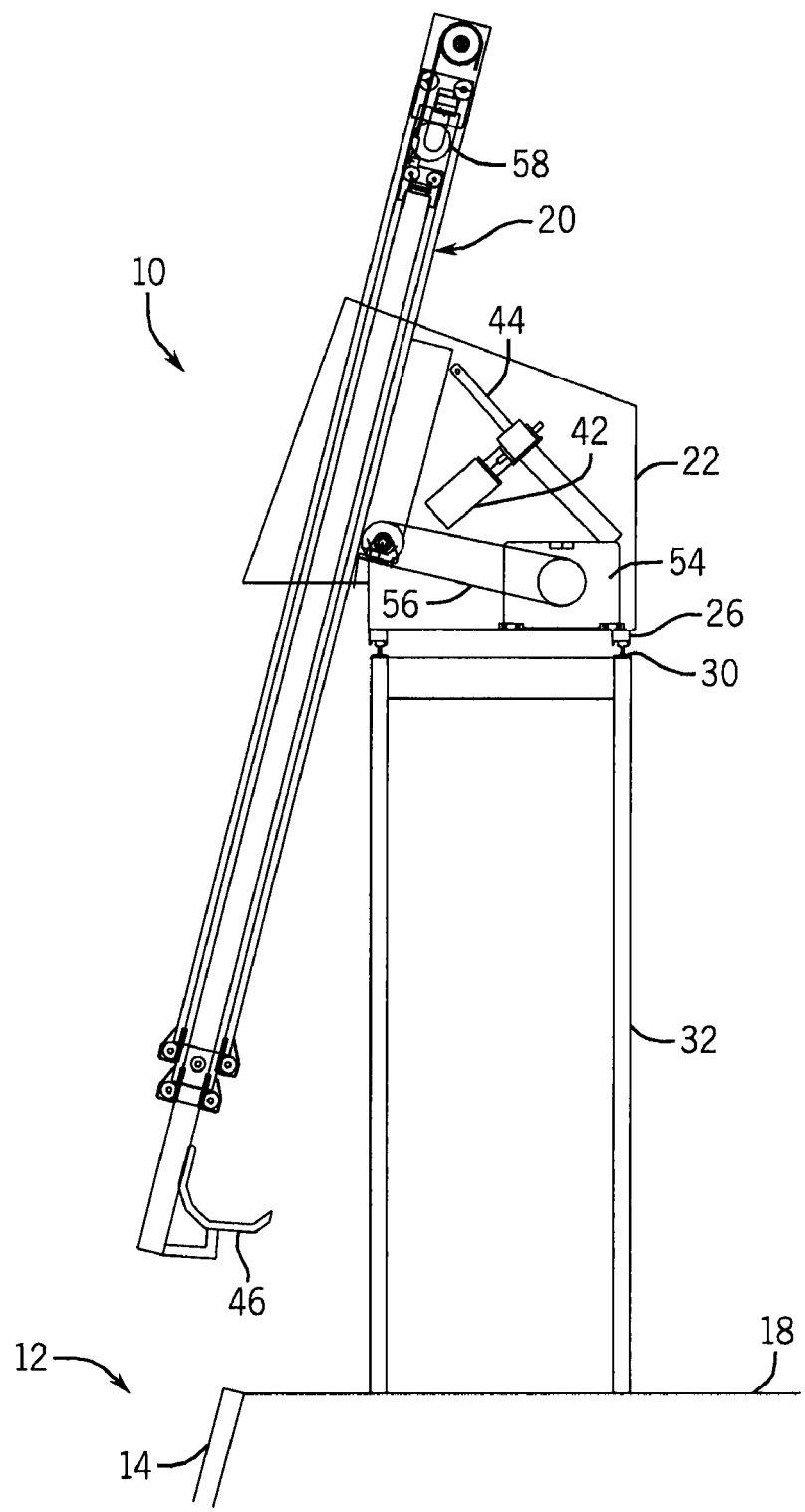
FIG. 4 is a schematic side view illustration of an exemplary trash rake system in accordance with the present invention as mounted on overhead rails above an intake rack from which debris is to be removed thereby.

The trash rake system support structure 22 may be positioned and mounted on the intake deck 18 such that the telescoping boom 20 extends outward from the intake deck 18 over the intake trash rack 12 to be cleaned. As illustrated in FIG. 1, the trash rake support structure 22 may be positioned and mounted directly on the intake deck 18. Alternatively, as illustrated in FIG. 4, the trash rake support structure 22 may be elevated above the intake deck 18. This configuration may be preferred in that it allows an operator to walk along the intake deck 18 underneath the trash rake system 10 during operation of the trash rake system 10 to clear debris from the trash intake rack 12 below.

The trash rake system support structure 22 preferably may be implemented as a movable carriage. Such a movable carriage support structure 22 is mounted on the intake deck 18, or in a position elevated over the intake deck 18, such that the carriage 22 may be moved along the intake trash rack 12 thereby to position the telescoping boom 20 at any position along the trash rack 12. For example, the carriage support structure 22 may be mounted via rotatable wheels 26 to a track structure 28 mounted running along the intake deck 18. Alternatively, as illustrated in FIG. 4, the tracks on which the carriage support structure 22 is mounted may be elevated overhead rails 30. For example, the elevated overhead rails 30 may be supported in position over the intake deck 18 by an appropriate sturdy overhead rail support structure 32.

A conventional electric carriage drive motor 34 may be provided in or on the carriage support structure 22 to drive the carriage support structure 22 and, therefore, the entire trash rake system 10, back and forth along the trash intake rack 12 to be cleaned, to position the trash rake system 10 in a desired position with respect thereto. For example, the carriage drive motor 34 may be coupled in a conventional manner to one or more of the wheels 26 supporting the carriage 22 on the rails 28 or 30, or to a separate rotatable carriage drive wheel 36. The type and size of electric carriage drive motor 34 to be employed will depend upon the size and weight of the particular trash rake system 10 in accordance with the present invention to be moved thereby.

The telescoping boom portion 20 of a trash rake system 10 in accordance with the present invention includes multiple elongated telescoping sections. For example, a three section telescoping boom 20 is illustrated in the figures presented herein. It should be understood, however, that a telescoping boom 20 employed in a trash rake system 10 in accordance with the present invention may have more or fewer than three telescoping sections.

A first or proximal section 38 of the telescoping boom 20 is mounted on the trash rake system support structure 22. The telescoping boom 20 is mounted in a movable hinged or rotatable relation to the support structure 22 in a conventional manner. Thus, the telescoping boom 20 may be tilted with respect to the support structure 22 to move a distal end 40 of the telescoping boom 20, which extends downward over the trash intake rack 12 to be cleaned, either inward toward the trash intake rack 12 or outward away from the trash intake rack 12. (FIG. 1 illustrates the telescoping boom 20 tilted in a position outward away from the intake trash rack 12 to be cleaned, as well as the position of the distal end 40 of the exemplary telescoping boom 20 in a position 40A where the telescoping boom 20 is tilted inward toward the trash intake rack 12 to be cleaned.)

An electric tilt drive motor 42 preferably is provided to tilt the telescoping boom 20 under power to position the distal end 40 thereof in a desired position with respect to the trash intake rack 12 to be cleaned. For example, the tilt drive motor 42 may be used to drive a rod 44 or other similar structure that is movably coupled to the telescoping boom 20 inward and outward, thereby to tilt the telescoping boom 20 into a desired position. Other conventional methods for coupling the tilt drive motor 42 to the telescoping boom 20 to provide powered adjustment of the tilt position of the telescoping boom 20 also or alternatively may be employed. The specific size and type of tilt drive motor 42 to be employed will depend upon the size and weight of the telescoping boom portion 20 of the trash rake system 10 to be moved thereby.

Figure 5:
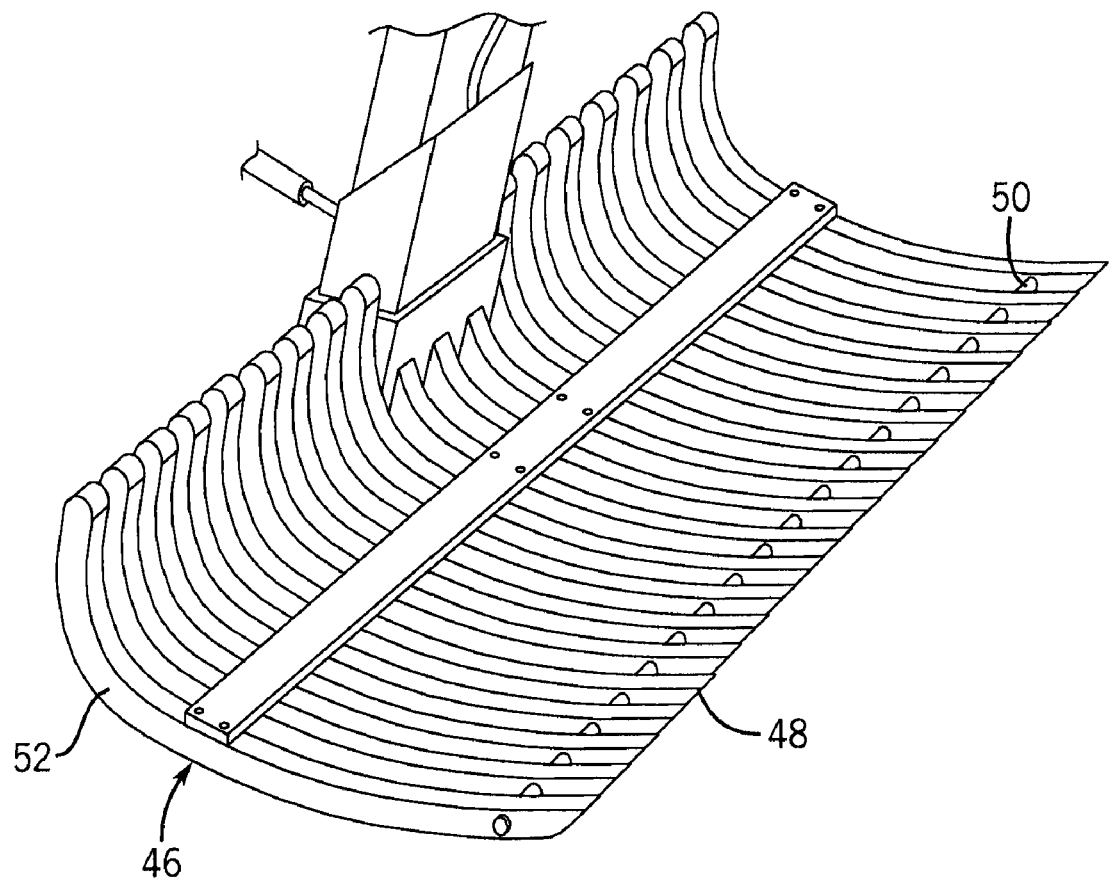
FIG. 5 is a perspective view illustration of an exemplary trash rake structure for use in a trash rake system in accordance with the present invention.

A trash rake structure 46 is mounted at the distal end 40 of the telescoping boom 20. An exemplary trash rake structure 46 that may be employed in accordance with the present invention is illustrated in FIG. 5. It should be understood, however, that other types, sizes, and configurations of trash rake structures may be employed in a trash rake system 10 in accordance with the present invention. For example, the trash rake structure employed in a trash rake system in accordance with the present invention may include brushes, scrapers, and other similar or different structures in addition to or in place of the rake tines 48 of the illustrated trash rake structure 46. An exemplary trash rake structure 46 to be employed in accordance with the present invention may include a plurality of rake tines 48 made of steel or another appropriate material. A plurality of parallel curved rake tines 48 may be provided to form a basket like shape for the trash rake structure 46. The spacing between the rake tines 48 preferably corresponds to the spacing between the blades 14 forming the trash intake rack 12 to be cleaned thereby. For example, the trash rake tines 48 preferably are spaced apart sufficiently such that adjacent tines extend into adjacent spaces between the blades 14 of the trash intake rack 12 when the trash rake structure 46 is placed against the surface of the trash intake rack 12 to engage the rack 12. Spacer rollers 50 may be provided between the rake tines 48, near but spaced backward from the ends thereof that are to engage the trash intake rack 12 to be cleaned. The spacer rollers 50 both limit the extent to which the ends of the rake tines 48 extend into the spaces between the intake trash rack blades 14, and facilitate the sliding of the trash rake structure 46 along the trash intake rack blades 14 during a cleaning operation as will be described in more detail below, during which the spacer rollers 50 are positioned against and roll along the intake rack blades 14.

The trash rake structure 46 preferably is mounted in a hinged or movable relation to the distal end 40 of the telescoping boom 20 such that the trash rake structure 46 may be moved between at least two different orientations with respect to the distal end of the boom 20, a raking position or orientation and a dumping position or orientation. In a raking position or orientation for the trash rake structure 46, as illustrated, e.g., in FIG. 1, the concave side of the rake structure 46 formed by the curved tines 48 faces upward. As will be discussed in more detail below, this raking position or orientation for the trash rake structure 46 is used as the trash rake structure 46 is drawn vertically upward along the trash intake rack 12 to clear debris therefrom. In the dumping position or orientation for the trash rake structure 46, as illustrated, for example, in FIG. 6, the concave side of the trash rake structure 46 formed by the curved tines 48 thereof faces downward. This position or orientation for the trash rake structure 46 is employed to dump debris gathered onto the trash rake structure 46 during the raking or cleaning operation at a desired trash dumping or disposal location located near the trash intake rack 12 being cleaned.

A conventional mechanism may be provided to operate remotely the position or orientation of the trash rake structure 46 from the raking position or orientation to the dumping position or orientation and back again. For example, one or more cables or chains may be run down the telescoping boom 20 and coupled to the movable trash rake structure 46 in an appropriate manner such that actuation of the cables or chains, either manually or using an electric motor, changes the orientation of the trash rake structure 46 between the raking and dumping positions and back again. Similarly, a rotatable auger or screw mechanism may be coupled to the rake structure 46 in an appropriate manner and driven by an electric or other motor to change the orientation of the trash rake structure 46 between the raking and dumping positions and back again. Alternatively, a single cable or chain may be attached to the trash rake structure 46 which, when actuated, moves the trash rake structure 46 from the raking position or orientation to the dumping position or orientation. A plate 52 or other similar structure may be mounted or otherwise attached to the trash rake structure 46 on the back or convex side of the rake tines 48. As the trash rake structure 46 is lowered into a flowing water source 15, with the trash rake structure 46 in the dumping position or orientation, the flow of water against the plate 52 pushes the trash rake structure 46 back into the raking position or orientation. This may be used either alone or in combination with another structure or method as an assist to moving the trash rake structure 46 from the dumping position or orientation back into the raking position or orientation. For example, an appropriate spring mechanism may be used, either alone or in addition to the plate 52 described above, to move the trash rake structure 46 from the dumping position or orientation back to the raking position or orientation. Appropriate releasable latching or similar mechanisms may be employed to ensure that, once the trash rake structure 46 is in the desired raking or dumping position or orientation, the position or orientation of the trash rake structure 46 does not change unintentionally until the position or orientation of the trash rake structure 46 is intentionally changed by an operator of the trash rake system 10 in accordance with the present invention.

In an alternative method, changing the orientation of the trash rake structure 46 from the raking position to the dumping position may be accomplished under power as part of the powered retraction of the telescoping boom 20. For example, the trash rake structure 46 may be mounted to the distal end of the telescoping boom 20 such that when the telescoping boom 20 is fully retracted a trip mechanism is activated to move the trash rake structure 46 from the raking position to the dumping position. As will be described in more detail below, retraction of the telescoping boom 20 may be controlled such that retraction of the boom under power is stopped automatically just before full retraction resulting in moving the trash rake structure 46 to the dumping position. A separate input preferably is required to retract fully the telescoping boom 20 to perform the dumping operation. This prevents an operator from accidentally fully retracting the telescoping boom 20 and thereby dumping the contents of the trash rake structure 46 unintentionally. When the telescoping boom 20 is extended from the fully retracted position the trip mechanism for moving the trash rake structure 46 to the dumping position is disengaged and the trash rake structure may be moved back into the raking position or orientation. This may be accomplished using a spring loaded mechanism to move the trash rake structure 46 back into the raking position and/or by employing the flow of water against the plate 52 mounted on the trash rake structure 46 as described above.

In accordance with the present invention, the trash rake structure 46 mounted at the distal end 40 of the telescoping boom 20 is moved vertically along the trash intake rack 12 to be cleaned by extension and retraction of the telescoping boom 20. Retraction and extension of the telescoping boom 20 to move the trash rake structure 46 attached thereto up and down along the trash intake rack 12 to be cleaned preferably is accomplished automatically under power using an electric motor driven winch 54, e.g., mounted in the trash rake system support structure 22, and coupled via a cable or chain 56 to a pulley and cable or chain system 58 mounted, e.g., at least partially within a hollow interior of the telescoping boom 20. The pulley and cable or chain structure 58 preferably is implemented in a conventional manner such that operation of the electric motor driven winch 54 in one direction extends the distal end 40 of the telescoping boom 20 under power, while operation of the electric motor driven winch 54 in the other direction retracts the distal end 40 of the telescoping boom 20. Thus, it is preferred that the movement of the distal end 40 of the telescoping boom 20 be automated and powered in both the extension and retraction thereof. Other electric motor driven mechanisms also or alternatively may be employed to retract and extend the telescoping boom 20 under power in both directions. The type and size of the electric motor used to drive the winch 54 or other mechanism for extending and retracting the telescoping boom 20 will depend upon the size weight of the boom to be extended and retracted thereby.

Figure 7:
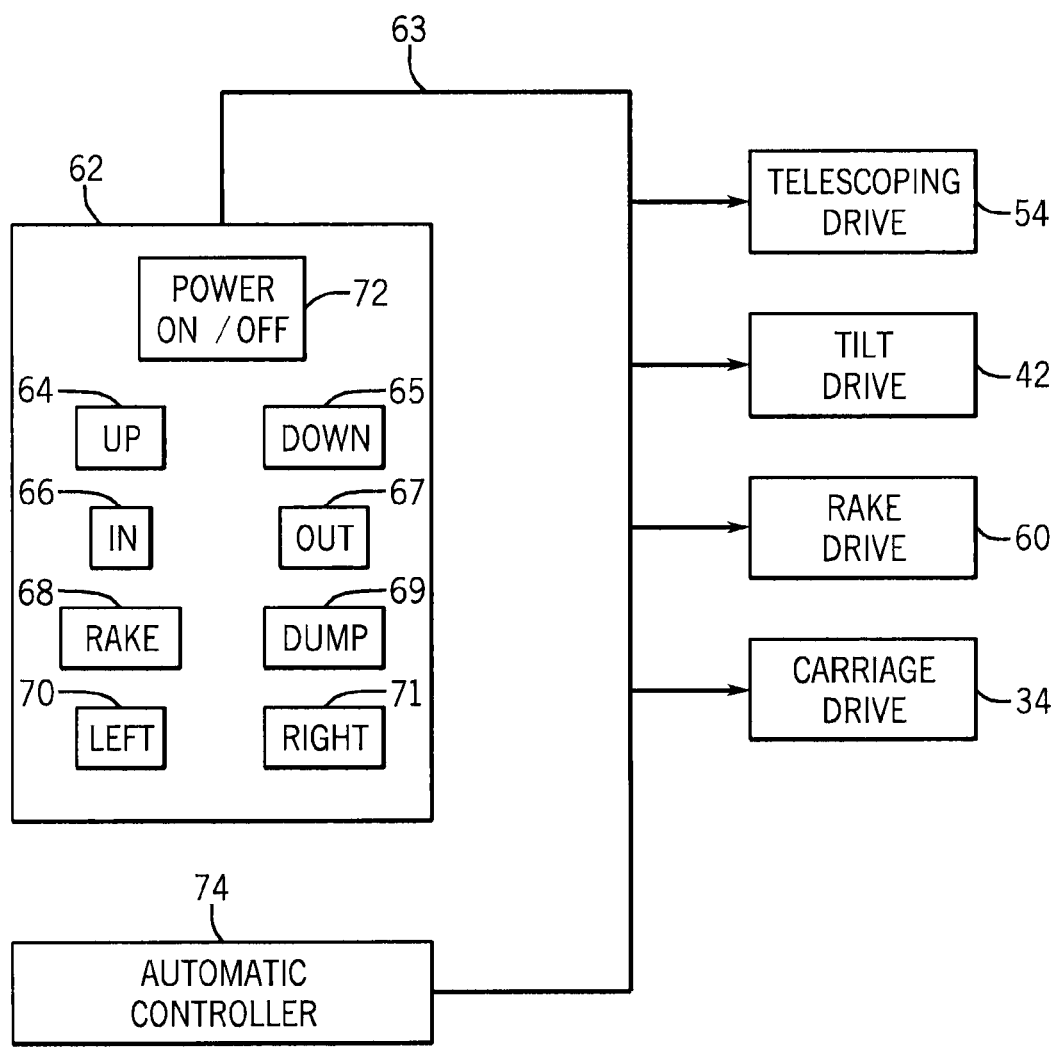
FIG. 7 is a schematic block diagram illustrating the various electric drive motors used to operate an exemplary trash rake system in accordance with the present invention along with a schematic illustration of an exemplary hand-held operator controller and an automatic controller for controlling operation of a trash rake system in accordance with the present invention.

As illustrated in FIG. 7, a hand held control unit 62 preferably may be provided to enable an operator of a trash rake system 10 in accordance with the present invention to control and use the trash rake system 10 to clean a trash intake rack 12 with which it is associated. The hand held control unit 62 may be implemented in a conventional manner to provide appropriate control signals under operator command, via a conventional wired or wireless connection 63, to control operation of the telescoping drive 54 for extending and retracting the telescoping boom 20, the tilt drive 42 for tilting the telescoping boom 20, a trash rake position drive 60 (if any) for changing the position of the trash rake structure 46 between the raking and dumping positions and back again, and the trash rake carriage drive 34 for moving the trash rake system 10 horizontally along the intake rack 12, as described above. It should be understood that appropriate electronic drive circuits (not shown) are provided between the hand held controller 62 and the various electric or other motors used to operate the trash rake system 10 in accordance with the present invention in order to convert the control signals provided by the hand held controller 62 into appropriate drive signals for controlling operation of the various electric or other motor drives.

The hand held controller 62 may be provided with various conventional buttons, switches, or other input mechanisms that may be actuated by an operator to generated the control signals required to position the trash rake system 10 in a desired position and to operate the trash rake system 10 during a cleaning operation. Various different types of physical or virtual buttons may be employed for this purpose. Alternatively, other conventional operator interface structures, such as a joy stick, may be employed to generate the control signals required to control operation of the various drives used to position and operate the trash rake system 10 in accordance with the present invention.

Figure 6:
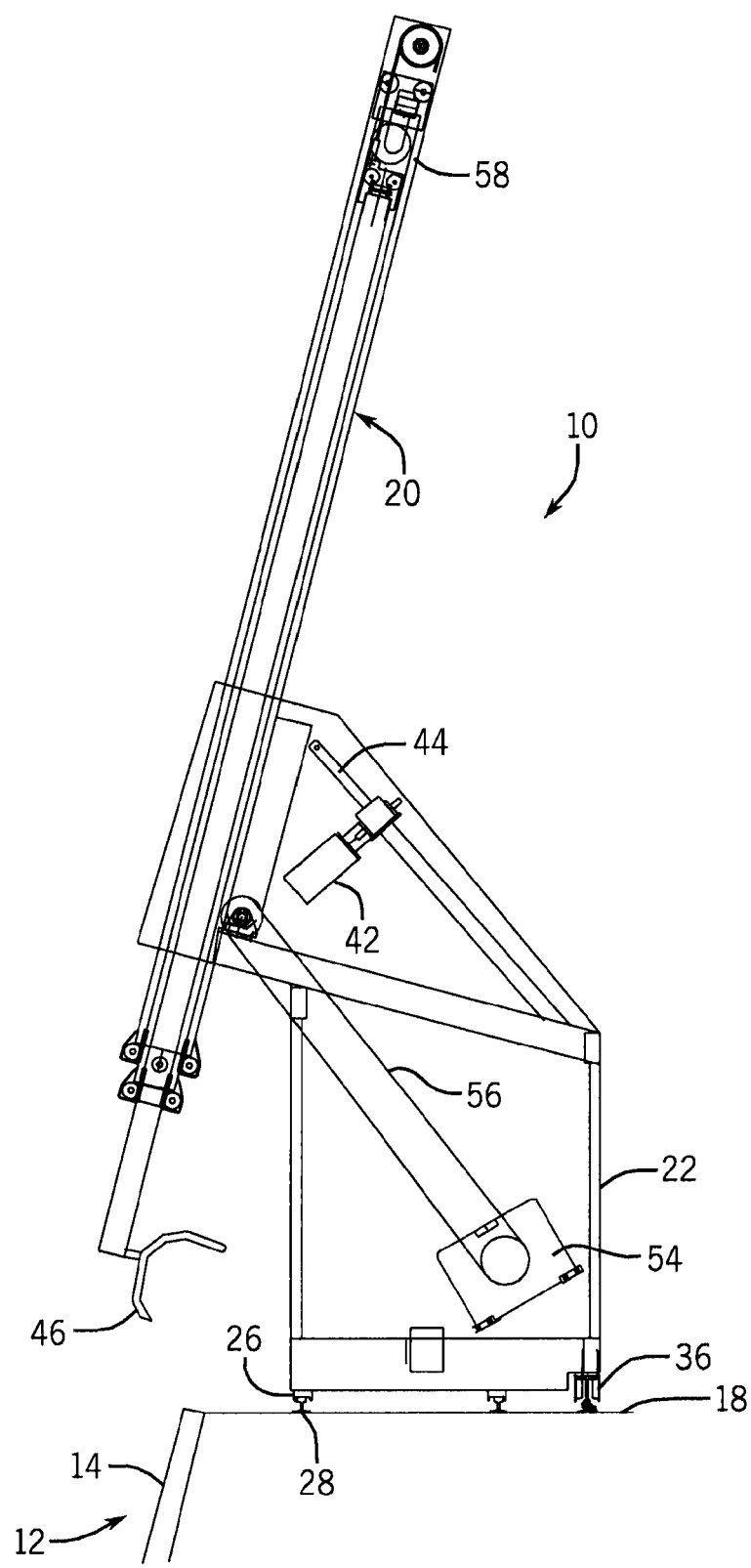
FIG. 6 is a schematic side view illustration of the trash rake system in accordance with the present invention of FIG. 1 showing a trash rake structure thereof in a dumping position.

In the exemplary hand held controller 62 illustrated in FIG. 7, "Up" 64 and "Down" 65 buttons are provided which, when actuated by an operator, generate and send appropriate control signals to operate the drive unit 54 for the telescoping boom 20, thereby, respectively, to retract the telescoping boom 20 to move the trash rake structure 46 attached to the distal end of the telescoping boom 20 upward, and to extend the telescoping boom 20 to move the trash rake structure 46 under power in a downward direction. "In" 66 and "Out" 67 buttons may be provided on the hand held control unit 62 which, when actuated by an operator, generate and send control signals to the tilt drive unit 42 to operate the tilt drive unit 42 to tilt the telescoping boom 20 such that the trash rake structure 46 at the distal end thereof is moved, respectively, either inward toward the surface of the trash intake rack 12 being cleaned or outward away from the trash intake rack 12 being cleaned. "Rake" 68 and "Dump" 69 buttons may be provided on the hand held controller 62 which, when actuated by an operator, generate and send control signals to a rake drive 60, if any, thereby, respectively, to move the trash rake structure 46 mounted at the distal end of the telescoping boom 20 into a raking position, as illustrated in FIG. 1, or a dumping position, as illustrated in FIG. 6. (Alternatively, the "Dump" button 69 may be used to generate a control signal to the telescoping drive 54 to fully retract the telescoping boom 20 thereby to engage a trip mechanism to move the trash rake structure 46 from the raking to the dumping position, as described above. In such a case, actuation of the "Up button 64 may be prevented from fully retracting the telescoping boom, to prevent unintended dumping of the trash rake structure 46.) "Left" 70 and "Right" 71 buttons may be provided on the hand held control unit 62 which, when actuated by an operator, generate and send control signals to the carriage drive 34, to operate the carriage drive to move the trash rake system 10 left and right, respectively, along the trash intake rack 12 to be cleaned thereby.

A "Power On/Off" 72 button also may be provided on the hand held control unit 62. The "Power On/Off" button 72 may be actuated by an operator of the hand held control unit 62 to activate the trash rake system 10 in accordance with the present invention for operation. Alternatively, and preferably, a power button, switch, or other device preferably may be provided in a secure location such that the trash rake system 10 may be operated only by authorized personnel. Furthermore, such a power switch or button may be secured by a failsafe system such that operation of the trash rake system 10 is prevented when the trash rake support structure 22 is accessed to perform maintenance or repair services on the electrical and mechanical equipment of the trash rake system 10. For example, access to the interior of the support structure 22 to service the machinery therein may require a key which, in turn, may be obtained only from a compartment which, when opened to obtain the key, locks out operation of the trash rake system 10.

Exemplary operation of the exemplary trash rake system 10 in accordance with the present invention described herein using the exemplary hand held controller 62 to clear debris from an associated trash intake rack 12 now will be described. This discussion will begin assuming that the trash rake system 10 in accordance with the present invention is in an initial position and condition as illustrated in FIG. 6, e.g., with the telescoping boom 20 retracted, with the distal end 40 thereof tilted inward, and with the trash rake structure 46 at the distal end thereof positioned in the dumping position. First the "Left" 70 and/or "Right" 71 buttons of the hand held unit 62 may be operated to send control signals to the carriage drive 34 thereby to move the carriage support structure 22 horizontally along the trash intake rack 12 to a desired position thereon to be cleaned. When the trash rake system 10 is in the desired position along the trash intake rack 12, the "Out" button 67 may be actuated to send control signals to the tilt drive 42 to tilt the distal end 40 of the telescoping boom 20 outward. The "Down" button 65 may then be actuated to extend the telescoping boom 20 under power to drive the distal end thereof with the trash rake structure 46 thereon downward below the water surface 16 at which debris is likely to collect against the trash intake rack 12. The "Rake" button 68 may be actuated to rotate the trash rake structure 46 at the distal end of the telescoping boom 20 into the raking position. (Alternatively, the trash rake structure may automatically be moved to into the raking position by operation of a spring mechanism and or water flow against the plate 52 attached to the trash rake structure 46, as described above.)

The "In" button 66 on the hand held operating unit 62 may then be actuated to send a control signal to the tilt drive 42 to tilt the distal end of the telescoping boom 20 inward such that the trash rake structure 46 mounted thereon engages the trash intake rack 12 to be cleaned. (I.e., the tines 48 of the trash rake structure 46 extend into the spaces between the intake trash rack blades 14.) After these operations, the trash rake structure 46 is in the position 40A as illustrated in FIG. 1. The "Up" button 64 on the hand held operating unit 62 is then actuated to send control signals to the telescoping boom winch drive 54 to operate the winch 54 to retract the telescoping boom 20. During retraction of the telescoping boom 20 the trash rake structure 46 at the distal end of the telescoping boom 20 is drawn upward along the intake rack 12 thereby to collect any debris collected against the intake rack blades 14 in the trash rake structure 46. When the telescoping boom 20 is substantially fully retracted the "Out" button 67 is actuated to send a control signal to the tilt drive 42 to tilt the distal end of the telescoping boom 20 outward to disengage the trash rake structure 46 from the intake rack 12 being cleared. The "Left" 70 and/or "Right" 71 buttons on the hand held control unit 62 may be actuated to move the trash rake system 10, with collected debris held in the trash rake structure 46, to a dumping location adjacent to the trash rack 12. With the trash rake system 10 in the desired dumping location, the "Dump" button 69 on the hand held control unit 62 may be actuated to move the trash rake structure 46 into the dumping position (either by activating a rake drive 60 or controlling the telescoping drive 54 to retract fully the telescoping boom 20), thereby to dump the debris collected therein into the desired dumping location. The process just described may then be repeated by moving the trash rake system 10 to different locations along the intake rack 12 to remove collected debris therefrom.

An intake rack cleaning process using a trash rake system 10 in accordance with the present invention as just described may be fully or partially automated, e.g., using an automatic controller 74 instead of or in addition to the hand held control unit 62. For example, the automatic controller 74 may be implemented as a microprocessor or other digital programmable based system that generates the control signals provided to the various drive units of the trash rake system 10 to perform automatically the steps described above to clear debris from an intake rack 12. Such automatic programmable operation may be useful in particular where the trash intake rack 12 and associated trash rake system 10 in accordance with the present invention are located in a remote location or where weather or other conditions would otherwise prevent an operator from operating the hand held control unit 62 to operate the trash rake system 10.

It should be understood that the present invention is not limited to the particular exemplary applications and embodiments illustrated and described herein, but embraces all embodiments thereof that may come within the scope of the following claims.

What is claimed is:

1. A trash rake system for use in clearing debris from an intake rack, comprising:
   (a) a moveable support structure;
   (b) a support structure electric drive system adapted to move the moveable support structure under power horizontally along the intake rack;
   (c) a telescoping boom tiltably mounted to the moveable support structure;
   (d) a trash rake structure moveably mounted at a distal end of the telescoping boom such that the trash rake structure is moveable between a raking position and a dumping position;
   (e) a telescoping boom electric drive system adapted to exert a force to extend and retract the telescoping boom under power, thereby to move the trash rake structure vertically along the intake rack; and
   (f) a tilt electric drive system adapted to tilt the telescoping boom with respect to the moveable support structure thereby to move the trash rake structure toward or away from the intake rack.

2. The trash rake system of claim 1 wherein the moveable support structure is mounted on wheels adapted to be mounted on a track positioned above the intake rack.

3. The trash rake system of claim 2 wherein the support structure drive system includes an electric motor coupled to the wheels to rotate the wheels under power thereby to move the moveable support structure under power horizontally along the intake rack.

4. The trash rake system of claim 1 wherein the telescoping boom includes a cable or chain and pulley operating mechanism for extending and retracting the telescoping boom and wherein the telescoping boom drive system includes an electric motor coupled to the cable or chain and pulley operating mechanism via a winch to operate the cable or chain and pulley operating mechanism under power to extend and retract the telescoping boom.

5. The trash rake system of claim 1 comprising additionally a hand held operator control unit coupled via a wired or wireless connection to the support structure drive system, to the telescoping boom drive system and to the tilt drive system, and adapted to provide control signals under operator control to control operation of the support structure drive system, the telescoping boom drive system, and the tilt drive system.

6. The trash rake system of claim 1 comprising additionally an automatic controller coupled to the support structure drive system, to the telescoping boom drive system and to the tilt drive system and adapted to provide a series of control signals to control operation of the support structure drive system, the telescoping boom drive system, and the tilt drive system thereby to operate the trash rake system to clear debris from an intake rack without operator intervention.

7. A method for operating a trash rake system to clear debris from an intake rack, comprising:
   (a) providing a trash rake system including a moveable support structure, a telescoping boom tiltably mounted to the moveable support structure, and a trash rake structure moveably mounted at a distal end of the telescoping boom such that the trash rake structure is moveable between a raking position and a dumping position;
   (b) moving the moveable support structure horizontally along the intake rack to position the telescoping boom at a desired position along the intake rack by operating an electric motor driven support structure drive system;
   (c) extending the telescoping boom under electric power to position the trash rake structure in a desired position by operating an electric motor driven telescoping boom drive system;
   (d) tilting the telescoping boom to bring the distal end thereof adjacent to the intake rack such that the trash rake structure in the raking position engages the intake rack;
   (e) retracting the telescoping boom under electric power to draw the trash rake vertically along the intake rack to clear debris therefrom by operating the electric motor driven telescoping boom drive system;
   (f) tilting the telescoping boom to move the distal end thereof away from the intake rack such that the trash rake structure disengages the intake rack by operating an electric motor driven tilt drive system;
   (g) moving the moveable support structure to a dumping location; and
   (h) moving the trash rake structure to the dumping position to dump cleared debris therefrom.

8. The method of claim 7 wherein the moveable support structure is mounted on wheels adapted to be mounted on a track positioned above the intake rack and wherein the support structure drive system includes an electric motor coupled to the wheels to rotate the wheels under power thereby to move the moveable support structure under power horizontally along the intake rack.

9. The method of claim 7 wherein the telescoping boom includes a cable or chain and pulley operating mechanism for extending and retracting the telescoping boom and wherein the telescoping boom drive system includes an electric motor coupled to the cable or chain and pulley operating mechanism via a winch to operate the cable or chain and pulley operating mechanism under power to extend and retract the telescoping boom.

10. The method of claim 7 wherein the trash rake system includes additionally a hand held operator control unit coupled via a wired or wireless connection to the support structure drive system, to the telescoping boom drive system and to the tilt drive system, and wherein moving the moveable support structure includes operating the hand held operator control unit to provide control signals to the support structure drive system, extending and retracting the telescoping boom includes operating the hand held operator control unit to provide control signals to the telescoping boom drive system, and tilting the telescoping boom includes operating the hand held operator control unit to provide control signals to the tilt drive system.

11. The method of claim 7 wherein the trash rake system includes additionally an automatic controller coupled to the support structure drive system, to the telescoping boom drive system and to the tilt drive system and wherein moving the moveable support structure, extending and retracting the telescoping boom, and tilting the telescoping boom includes providing a series of control signals from the automatic controller to control operation of the support structure drive system, the telescoping boom drive system, and the tilt drive system respectively, thereby to operate the trash rake system to clear debris from an intake rack without operator intervention.

12. A trash rake system for use in clearing debris from an intake rack, comprising:
 (a) a moveable support structure;
 (b) an electric motor powered support structure drive system adapted to move the moveable support structure under power horizontally along the intake rack;
 (c) a telescoping boom tiltably mounted to the moveable support structure;
 (d) a trash rake structure moveably mounted at a distal end of the telescoping boom such that the trash rake structure is moveable between a raking position and a dumping position;
 (e) an electric motor powered telescoping boom drive system adapted to extend and retract the telescoping boom under power provided by an electric motor, thereby to move the trash rake structure vertically along the intake rack; and
 (f) an electric motor powered tilt drive system adapted to tilt the telescoping boom with respect to the moveable support structure thereby to move the trash rake structure toward or away from the intake rack.

13. The trash rake system of claim 12 wherein the moveable support structure is mounted on wheels adapted to be mounted on a track positioned above the intake rack.

14. The trash rake system of claim 13 wherein the support structure drive system includes an electric motor coupled to the wheels to rotate the wheels under power thereby to move the moveable support structure under power horizontally along the intake rack.

15. The trash rake system of claim 12 wherein the telescoping boom includes a cable or chain and pulley operating mechanism for extending and retracting the telescoping boom and wherein the telescoping boom drive system includes an electric motor coupled to the cable or chain and pulley operating mechanism via a winch to operate the cable or chain and pulley operating mechanism under power to extend and retract the telescoping boom.

16. The trash rake system of claim 12 comprising additionally a hand held operator control unit coupled via a wired or wireless connection to the support structure drive system, to the telescoping boom drive system and to the tilt drive system, and adapted to provide control signals under operator control to control operation of the support structure drive system, the telescoping boom drive system, and the tilt drive system.

17. The trash rake system of claim 12 comprising additionally an automatic controller coupled to the support structure drive system, to the telescoping boom drive system and to the tilt drive system and adapted to provide a series of control signals to control operation of the support structure drive system, the telescoping boom drive system, and the tilt drive system thereby to operate the trash rake system to clear debris from an intake rack without operator intervention.

* * * * *